No. 680,738. Patented Aug. 20, 1901.
G. SERRAZANETTI.
MEANS FOR DAMMING TORRENTS.
(Application filed June 12, 1900.)

(No Model.)

Witnesses:
J. C. Lebret.
A. Witt.

Inventor:
Giulio Serrazanetti,
By J. H. de Vos.
Attorney.

THE NORRIS PETERS CO., PHOTO-LITHO., WASHINGTON, D. C.

UNITED STATES PATENT OFFICE.

GIULIO SERRAZANETTI, OF CASTENASO, ITALY.

MEANS FOR DAMMING TORRENTS.

SPECIFICATION forming part of Letters Patent No. 680,738, dated August 20, 1901.

Application filed June 12, 1900. Serial No. 20,044. (No model.)

*To all whom it may concern:*

Be it known that I, GIULIO SERRAZANETTI, of the village of Castenaso, Province of Bologna, Italy, have invented certain new and useful Improvements in Means for Damming Torrents, of which the following is a specification.

Hitherto no efficient means have been discovered for regulating torrents with a view to lowering the level they reach in consequence of a sudden increase in the volume of water yielded by torrential rains. Usually the water is allowed to flow freely, and as it comes in great quantities it frequently causes considerable damage.

I have invented improved means for damming the torrents, in combination with canals or channels, which prevent destructive overflows by providing for the gradual draining off of the surplus water from and into one or a series of reservoirs formed by the dams.

The details of the invention are set forth in the following description and are represented in a general and diagrammatic manner in the accompanying drawings, whereof—

Figure 1:
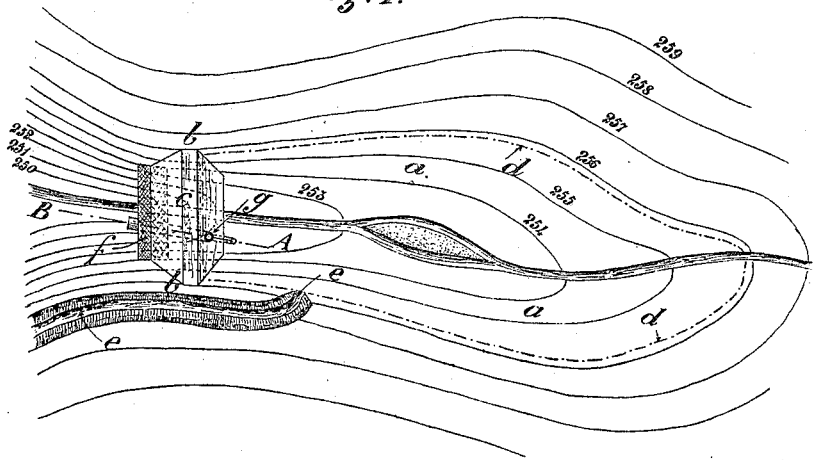
Figure 2:
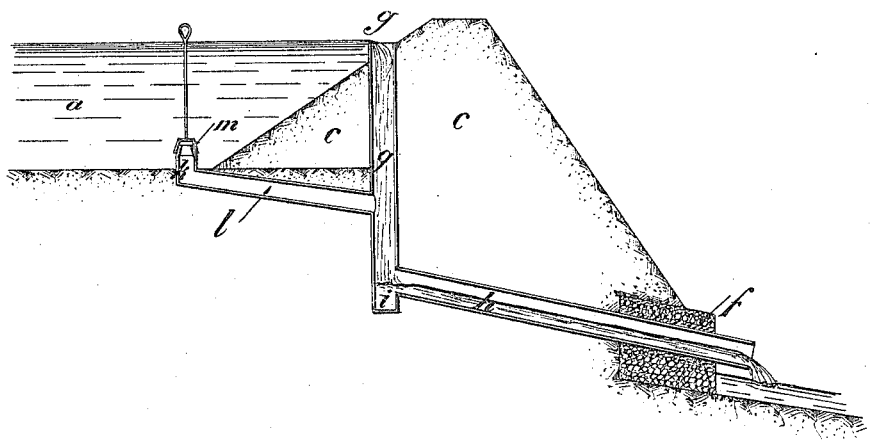

Figure 1 is a topographical view of a short section of valley with a torrential watercourse, and Fig. 2 is a section on the line A B of Fig. 1.

In carrying my invention into practical effect and after due study of the locality I choose by preference a wide portion $a$ of the valley terminated by a narrow part $b$. (See Fig. 1.) In this narrow part I arrange an insubmergeable dike or dam, which is constructed in such a manner as to exceed by about eighty centimeters the height of the high waters and so that the water-reservoir formed in $a$ may only be filled up to the level $d$. On one or both sides of the hills or banks an outflow-canal following the slope of the valley brings the water along and conveys the same back again into the bed of the river at a given distance from the dike $c$ to prevent the latter from being damaged. If there happens to be a rocky hill or bank alongside the canal, I form a waterfall wherever the nature of the hill will allow of the same being maintained. Should such an arrangement not be forthcoming, I place at the end of the canal a wooden conduit which will serve to protect the hills or banks bordering the river-bed from being damaged by the onrush of the water.

The pier-head is built in the ordinary way, and I merely strengthen it at its lower part by means of a block, two-thirds of which are under the foundation and one-third above. This block has the form of a parallelepiped, the six sides of which are made of iron-wire trellis-work consolidated by cross and longitudinal iron band and the central part of which is filled with stones and gravel. The upper part of the retaining-wall is made of earthwork well beaten down, while its lower part consists of a mixture of earth and straw, which promptly forms an impermeable mass. If the reservoirs follow one another, the same method of construction can be adopted in each case; but they must be at a certain distance one from the other, so that owing to its reduced power the water may not cause too much damage in the plain. Instead of the canals $e$ one or more pits $g$ may be used, the upper opening of which is at least about eighty centimeters below the ridge of the dike $c$. From these vertical pits start a number of outflow channels or conduits $h$, having but a slight inclination and conveying the water outside the dike, where should the nature of the ground be favorable the same is allowed to run through other channels in the river of the valley. The lower part of the vertical pit $g$ is filled with stones as far as the mouth of the conduit $h$ to prevent the deterioration of the latter by the violent fall of the water. In the drawings only one such pit is shown; but it is obvious that several pits may be sunk when the nature of the ground allows of it, and they may either act independently from one another or be connected together. To allow the water to run off from the reservoir $a$, (see Fig. 2,) I use a conduit $k$, arranged at a small height from the bed-surface of the brook or river, and connected to the pit $g$ by means of the conduit $l$, which has but a slight slope. If the pit $g$ is not to be made use of, the canal I should be prolonged outside the dike, and thus leave a free passage. In such cases the canal $k$ must be made deeper while the canal I must have a steeper slope. The canal $k$ is terminated at the top with a conical and tubular fitting closed by a lid or cover $m$, likewise conical, which may be manipulated by hand with the aid of a rod. While the water fills the basin or reservoir $a$, it exerts at the same time a pressure upon the lid or cover $m$, and thus closes the outflow-canal $k\ l$. When the lid or cover is removed, the reservoir is completely emptied when the nature of the torrent allows of it, and the water may run off through the said channel $k\ l$.

The aforesaid pits and canals or conduits may be constituted of cement or metallic pipes, which are readily jointed together and laid, so that the construction is cheap, while the cost of maintenance is practically nothing. The use of such pipe is entirely practicable even for carrying considerable volumes of water, since there may be as many pits and canals as the conditions require.

By the use of my invention the following objects and advantages are attained—that is to say: During the rapid rising of the water the inundation of valleys is prevented as the water is successively caught up and stored in several basins or reservoirs. The water deposits the earth or soil carried away by the flow, and thus forms a vegetable soil. The use of pits $g$ and conduits or canals $h$ of proper capacity, and particularly when there are a plurality of dikes with their pits and canals at different levels, permits the surplus torrential waters to be safely drawn off at a line which is eighty centimeters below high-water mark, this being the level of the top of the pit $g$. The level of the torrential water in the reservoir will therefore never exceed the level of the dotted line $d$, Fig. 1.

I also in certain cases construct a canal or canals $e$ on one or both sides of the valley, which convey much of the torrential waters around the dike $c$ and lock into the stream at a point sufficiently below the dike to avoid injury to it.

Having thus particularly described and ascertained the nature of my said invention and in what manner the same is to be performed, I declare that what I claim is—

The combination in means for damming torrents of a dike across in a torrential valley adapted to form a storage-reservoir, a block at the foot of the external slope of the dike consisting of a layer of stones inclosed in a wire casing, a vertical pit $g$ adapted to draw off the waters, a conduit $h$ connected with said pit and adapted to deliver its waters below the dike, a lateral canal $e$ around the dike, an outflow-channel $l$ adapted to empty the reservoir and means for opening and closing said channel $l$, substantially as described.

In testimony whereof I have signed this specification in the presence of two subscribing witnesses.

GIULIO SERRAZANETTI.

Witnesses:
   INGR. LETTERIO LAHOCCETTA,
   WILZENEDITTI.